US011058230B2

(12) United States Patent
Schleicher (10) Patent No.: US 11,058,230 B2
(45) Date of Patent: Jul. 13, 2021

(54) CHANGING STATION (71) Applicant: Miniwim UG (haftungsbeschränkt), Munich (DE)

(72) Inventor: Mark Schleicher, Munich (DE)

(73) Assignee: Miniwim UG (haftungsbeschränkt), Munich (DE)

(*) Notice: Subject to any disclaimer, the term of this patent is extended or adjusted under 35 U.S.C. 154(b) by 0 days.

(21) Appl. No.: 16/631,479

(22) PCT Filed: Jul. 10, 2018

(86) PCT No.: PCT/EP2018/068700
§ 371 (c)(1),
(2) Date: Jan. 16, 2020

(87) PCT Pub. No.: WO2019/016037
PCT Pub. Date: Jan. 24, 2019

(65) Prior Publication Data
US 2020/0205583 A1 Jul. 2, 2020

(30) Foreign Application Priority Data
Jul. 18, 2017 (DE) .................... 10 2017 212 269.2

(51) Int. Cl.
*A47D 15/00* (2006.01)
*A47D 5/00* (2006.01)
*G05B 11/01* (2006.01)

(52) U.S. Cl.
CPC ............. *A47D 15/008* (2013.01); *A47D 5/00* (2013.01); *G05B 11/01* (2013.01)

(58) Field of Classification Search
CPC .......... A47D 5/00; A47D 5/003; A47D 5/006; A47D 15/008; G05B 11/00
See application file for complete search history.

(56) References Cited

U.S. PATENT DOCUMENTS 3,188,984 A 6/1965 Brooker
4,876,970 A * 10/1989 Bolduc ................. A47D 5/003
108/35

FOREIGN PATENT DOCUMENTS

| DE | 2 202 198 A | 7/1973 |
|----|----|----|
| DE | 10 2006 016 921 A1 | 10/2007 |
| EP | 1 504 696 A2 | 2/2005 |
| FR | 2 772 577 | 6/1999 |
| FR | 2 803 732 | 7/2001 |
| FR | 2 841 113 | 12/2003 |
| JP | S55-24404 U | 2/1980 |
| WO | 97/39661 A1 | 10/1997 |
| WO | 2007/135271 A2 | 11/2007 |

OTHER PUBLICATIONS

International Search Report and Written Opinion for corresponding Patent Application No. PCT/EP2018/068700 dated Sep. 19, 2018.

* cited by examiner

*Primary Examiner* — Fredrick C Conley
(74) *Attorney, Agent, or Firm* — Renner, Otto, Boisselle & Sklar, LLP (57) ABSTRACT

The present invention concerns shelves (10, 20, 30, 40, 50) for changing the diaper of an infant or toddler. A shelf comprises a movable barrier (13) and a facility (18, 53) for automatically detecting a caregiver. The facility for automatically detecting is adapted to bring the movable barrier into an open state when the facility for automatically detecting detects a caregiver.

22 Claims, 5 Drawing Sheets

CHANGING STATION

1. TECHNICAL FIELD

The invention relates to shelves for changing (diapers) of infants (including babies) or toddlers (including small children).

2. STATE OF THE ART

Shelves for changing the diapers (or nappies) of babies or small children are used in various forms, e.g. as changing tables, changing units, attachments (or tops) for changing tables or changing units, or other surfaces for changing diapers. They are used to enable babies to be changed and cared for in familiar surroundings and at a height that is comfortable for the person changing the baby.

Falling from the changing table is one of the most common causes of accidents among infants. Absolute accident figures are difficult to find, but it is assumed that statistically every second child falls from the changing table in his or her lifetime. The consequences are often permanent and serious. In training courses such as birth preparation courses and with pediatricians this problem is well known. Parents are therefore strongly advised on a variety of occasions to always have one hand on the child when it is being changed to avoid falling. However, the accident figures that occur make it clear that this advice is difficult to follow in reality. Often unexpected events occur that attract the attention of the diaper-changing caregiver (or supervisor), for example if the sibling in the next room has been hurt or the postman rings the bell.

The most critical phase is between the fourth and sixth month of life. During this period, infants usually begin to turn and move forward. For months, parents have become accustomed to their child not moving and therefore usually no longer have an increased alarm awareness when changing diapers. However, falls from changing tables often occur just when the baby is turning for the first time in its life.

The existing solutions to prevent falls are either uncomfortable or do not solve the problem completely.

Changing tables with a belt solution are particularly popular in the USA. A changing table with a belt solution, for example, has become known as "Solid Easymove" (http://www.heberhard.at/Wickeltisch-klappbarSolid-Easy-move-890300.html). Even though the belt prevents the child from falling off the changing table, it also prevents comfortable nappy-changing.

Some changing tables have barriers that prevent the child from falling down on the left or right side as well as the back. However, the side facing the diaper changing caregiver remains free with these changing tables. These changing tables do not prevent the child from falling over the front, e.g. if the changing supervisor is distracted and moves away from the changing table.

Some diaper-changing tables also have barriers at the front. However, these barriers are usually particularly low so that they are not in the way during the nappy changing process. This is because too high barriers make it uncomfortable to put the baby in and take it out of the shelf. Such a solution has become known, for example, as "Ikea Gulliver". However, this solution only postpones the described fall problem to a later month of life, when the children can then overcome this small barrier.

FR 2 772 577 discloses a changing shelf with a movable barrier which, in a safety position, prevents the child from falling. However, this changing shelf has the disadvantage that the barrier has to be moved from a safety position to a position suitable for changing nappies either by a pedal or a push button. The fact that the person who wants to change the baby on the changing table must simultaneously activate a movement of the barrier by pressing a push button or pedal makes this changing table cumbersome and distracts the attention of the person changing the baby.

Similarly, a changing table is known from FR 2 841 113, in which a barrier must be moved from an active position to a low position by the caregiver using a lever. Here, too, a cumbersome operation by actuating the lever is necessary, which distracts the attention of the nappy changing person from the infant. In addition, the structure of the changing unit is very complex. Similar complex solutions with pedals, levers or push buttons are known from FR 2 803 732, WO 2007/135271 or WO 97/39661.

The DE 2202198 A reveals a baby changing table with a front safety wall which is manually swiveled out of its safety position by the operator.

DE 10 2006 016 921 A1 discloses a changing table with a surface for changing the child with a fall prevention device which does not prevent the child from rolling down, so as not to lull the mother in false security, but which picks up the falling child before it reaches the floor in case of a fall. U.S. Pat. No. 3,188,984 A discloses a safety net for changing tables that picks up a falling child.

It is therefore an object of the present invention to improve the operability and safety of shelves for diaper changing.

3. SUMMARY OF THE INVENTION

In one embodiment, at least one aspect of the problem according to the invention is solved by a shelf for changing (the diaper of) an infant or toddler, which has a movable barrier. The shelf has a facility for automatically detecting a caregiver, wherein the facility for automatically detecting is configured to bring the movable barrier into an open state when the facility for automatically detecting detects a caregiver.

The shelf thus has a barrier that can safely prevent the infant or toddler from falling down if there is no caregiver (e.g. an adult person changing the infant or toddler) at the shelf. However, as soon as the facility for automatically detecting (hereinafter also sometimes referred to as detection device) detects a caregiver, the barrier is opened so that the caregiver can comfortably place the infant or toddler on the shelf or remove it from the table without an obstructive barrier in the way. The caregiver does not have to perform any active movement, such as pressing a pedal or pushing a button. Instead, the caregiver is automatically detected by the changing table, so that the barrier is opened. The detection device of the shelf is a passive one (the caregiver does not have to perform any active movement, such as pressing a pedal or pushing a button). For example, the detection device can automatically detect when the caregiver is at (or in close proximity) a front side of the shelf which is intended for allowing access to the shelf. The shelf can thus be configured to detect when a caregiver is standing in front of it. The automatic detection of the caregiver and the subsequent opening of the barrier makes it possible to comfortably change the baby. The caregiver does not have to be concerned with operating the shelf by pressing buttons or using levers while carrying the baby in his or her hand, but can devote his or her full attention to the baby.

For example, the detection device may be located at the front of the shelf and/or automatically detect when a caregiver comes to a front side of the shelf. For example, the movable barrier can also be located at the front side of the shelf, so that the shelf can be conveniently accessed when the movable barrier is open. For example, immobile barriers can be placed on the other sides of the shelf (e.g. back, left side, right side) so that the child cannot fall from all sides.

The shelf can be configured, for example, as a changing table, a changing unit, an attachment for a changing table or a changing unit. The attachment can have a surface for changing diapers or be configured without such a surface. In one example, the attachment has a movable barrier. The barrier is configured to be placed on a surface of the changing table or changing unit for changing an infant or toddler. The barrier is configured to prevent the infant or young child from falling from the surface. The attachment also has a facility for automatically detecting a caregiver. The facility for automatically detecting is configured to bring the movable barrier into an open state when it detects a caregiver. In addition, the attachment may have other features as described in general terms in relation to a shelf, changing unit or changing table.

The movable barrier may have one or more dimensionally stable elements, e.g. board, bar, etc., and/or one or more flexible elements, e.g. fabric, net, etc. These elements can be movable and/or immovable. The movable barrier may be continuous or discontinuous (e.g. as battlements, railings, etc.) horizontally and/or vertically. It is crucial that the movable barrier is configured in such a way that it safely prevents the infant from falling over the barrier when closed and allows convenient access to the shelf when open. Properties of a movable element described herein may also refer to the movable barrier itself.

The detection device may also be configured to bring the movable barrier into a closed state if it does not detect a caregiver. If the caregiver moves away from the changing table, the child is automatically protected. Again, the caregiver does not need to make any active movement to secure the changing table. Instead, the detection device automatically detects when the attendant moves away from the changing table. It can therefore be ruled out that careless removal of the caregiver could lead to the infant falling from the support. As soon as the detection device no longer detects a caregiver, the movable barrier is brought into a closed state so that the fall protection is automatically activated. This means that the shelf can have an automatically activated and deactivated fall protection.

The shelf may have a blocking device, which is set up in such a way that the movable barrier cannot be moved into the open position by direct force on the movable barrier. In particular, this can prevent the infant on the shelf from pushing the barrier into the open state by pressing against it, thus preventing the risk of falling again. Instead, such a movement of the barrier is prevented by the blocking device acting directly on the barrier. At the same time, the blocking device is configured so that the device for detection brings the barrier into the open state as soon as a caregiver is detected, without the need for unlocking. The detection device—as explained—brings the movable barrier into the open state as soon as it detects a caregiver. This enables safe operation of the shelf without the need for time-consuming securing or unlocking. The blocking device can be mechanically connected to the detection device and/or the movable barrier.

The blocking device may be movable in a first direction of movement and block in a second direction of movement. This makes it possible, on the one hand, to prevent movement of the barrier by direct application of force (blocking in the second direction of movement), while on the other hand the barrier can be moved over the device for detecting a caregiver (movability in the first direction of movement). This provides a simple mechanical solution to allow safe operation of the shelf without the need for time-consuming securing or unlocking.

The shelf may be configured so that the detection device, when bringing the movable barrier to the open position, moves the blocking device in the first direction of movement. Thus, the detection device is able to open the barrier without having to separately secure or release the blocking device. The blocking device may, for example, comprise a rotatable roller, wherein the detecting means rotates the roller in a first direction of movement in which the roller is rotatable, thereby initiating movement of the barrier into the open state. The roller may be configured such that the second direction of movement corresponds to a rotation in the opposite direction in which the roller is not rotatable. The roller may be configured so that direct force on the barrier causes the roller to rotate in the opposite, blocked, direction. Thus, a movement of the barrier is blocked by direct force on the barrier.

The shelf may also be configured in such a way that a direct application of force on the movable barrier implies a movement of the blocking device in the second direction of movement. This provides a simple mechanical solution to prevent unwanted deactivation of the barrier by direct force (e.g. by the infant itself). The force acts in the direction of the second (blocked) direction of movement, so that the force cannot cause the movable barrier to move. The shelf may be configured in such a way that a direct application of force on the movable barrier cannot cause the blocking device to move in the first direction of movement. Force applied to the movable barrier in the direction of the open state implies movement of the blocking device in the second direction of movement.

The shelf may also be configured so that the blocking device is activated if the detection device does not detect a caregiver. Separate activation of the blocking device by the caregiver is therefore not necessary. As soon as no caregiver is detected, the blocking device is activated. When activated, the blocking device can be moved in the first direction of movement and blocked in the second direction of movement. The movable barrier cannot then be opened by direct force, as explained above. Therefore, there is no safety risk if the caregiver quickly moves away from the shelf and forgets to activate the blocking device.

The shelf may also be configured to disable the blocking device when the detection device detects a caregiver. Separate deactivation of the blocking device by the caregiver is therefore not necessary. This allows the carer to devote their full attention to the child. When deactivated, the blocking device can also be moved in the second direction, so that the movable barrier can be moved to the closed state as soon as no caregiver is detected.

The shelf may have a front face intended for access by a caregiver, with the movable barrier located at least at the front. The movable barrier at the front allows convenient access when the barrier is open and at the same time prevents the child at the front from falling down when the barrier is closed. In some examples, more than one movable barrier may be provided at the front. In some examples, at least one immovable barrier is provided on at least one or all of the other sides (e.g. back, right-hand side, left-hand side) of the shelf, preventing the child from falling down on the other sides. Alternatively or in addition, at least one movable barrier may also be arranged on at least one of the remaining sides of the shelf, which is configured as described herein. In one example, the shelf can be essentially four-sided, with the shelf having a front, a back, and right and left sides. At least one movable barrier can be located at the front. For example, one or more or all three of the remaining sides may each have one or more immovable barriers, so that the child is safely prevented from falling from these sides as well. In some examples, a movable barrier is only located at the front of the shelf, while one or two or all of the remaining sides have no movable barrier.

An immovable barrier can be placed on the right-hand side, the left-hand side and/or the back of the shelf. At least one immovable barrier may be provided on each of the sides not intended for access by a caregiver, e.g. lateral (right and left) sides and rear, to prevent the infant from falling. The barrier may be configured to be immobile, as the barrier on these sides does not significantly restrict access by the carer, thus allowing for easier and less expensive assembly.

The movable barrier may have at least one movable element. For example, the movable element may have a plate or a board or may be configured as a plate or board. For example, the movable element may have an elastic and/or soft material on at least one side. This can be used to cushion any contact between the movable element and the infant.

The movable barrier may have at least one movable element which is rotatable. The movable element may be rotatable e.g. around a longitudinal axis, e.g. by about 90°. For example, the movable element can be rotated from a substantially vertical state (corresponding to the closed state of the movable barrier) to a substantially horizontal state (corresponding to the open state of the movable barrier), so that the movable barrier can be brought from the closed state to the open state. For example, the movable element in the open state may be arranged to be substantially flush with a surface of the shelf. For example, in the closed state, the movable element may be arranged to be substantially perpendicular to a surface of the shelf. The surface of the shelf may be intended to support the infant and may be located on an upper side of the shelf.

The movable barrier may include at least one movable element that can be lowered below a surface of the shelf. The surface of the shelf may be intended to support the infant and may be located on an upper side of the shelf. For example, the movable element may be moved from a raised position (corresponding to the closed state of the movable barrier) to a lowered position (corresponding to the open state of the movable barrier). The associated direction of movement can, for example, be essentially perpendicular to a longitudinal axis of the movable element. However, it is also possible that the movable element can be lowered by a rotary movement. For example, the movable element can be rotated around a longitudinal axis, e.g. by about 180°. The axis of rotation can run along a lower edge or underside of the movable element (in the raised position). The movable barrier can be lowered completely or only partly below the surface of the shelf.

The device for detection may be configured to detect the weight of the caregiver. In this way, it is possible to detect as soon as a caregiver is at the shelf, e.g. placed on the side (front) of the shelf intended for access by the caregiver. At the same time, it can be prevented that the detection of a caregiver is wrongly triggered by an infant, e.g. a sibling, or by light weight pets. For example, the detection device can detect the presence of a person with a body weight above a certain threshold (e.g. >30 kg, e.g. corresponding to a ten-year-old child; >40 kg; >50 kg; >60 kg etc.). For example, the detection device can be configured to detect the weight of the caregiver at the front of the shelf.

The detection device may have an area configured to accommodate the caregiver. For example, the area may be located at the front of the shelf. When a caregiver wants to access the shelf, he or she will necessarily enter the area at the front of the shelf. As soon as the area accommodates the caregiver, this is detected, so that the detection device moves the movable barrier to the open state. When the caregiver leaves the area, this is also detected, so that the detection device moves the movable barrier into the closed state. For example, the weight of the caregiver on the area may cause the area to move (e.g. downwards following the weight force), which in turn causes the movable barrier to open. For example, the detection device may include a spring or other reset device that automatically returns the movable barrier to the closed state (e.g. by moving the area upwards) when the weight of the caregiver leaves the area.

The area may be configured so that it moves downwards when a caregiver is present, so that the movable barrier is mechanically brought into the open state. This has the advantage of a simple mechanical solution that can be manufactured at low cost and is less prone to error. A reset device can ensure that the area moves upwards again when the caregiver leaves the area, so that the movable barrier is mechanically brought into the closed state.

In general, the detection device may include a movable detector element configured to move automatically when a caregiver accesses the shelf so that he/she is automatically detected.

The shelf may have a front side intended for access by the caregiver, and the detection device may have a horizontally movable detector element arranged at the front side. The detector element may be configured in such a way that when a caregiver accesses the shelf, the detector element is inevitably moved by the body mass of the caregiver, wherein a detection is triggered by this movement. The movable detector element can, for example, extend in a horizontal direction over a substantial part of the front so that the caregiver automatically moves the movable detector element when accessing the front, e.g. towards the shelf. The movable detector element may, for example, be a plate or board extending horizontally over a substantial part of the front of the shelf. For example, the movable detector element may extend over the entire width of the front of the shelf. Alternatively, the movable detector element may extend over at least 30%, at least 50% or at least 75% of the width of the front of the shelf and be centered horizontally on the front of the shelf. The movable detector element may be positioned so that it is approximately at hip height and/or approximately at stomach height of a caregiver.

The horizontally movable detector element can be configured to move horizontally when a caregiver accesses the shelf, so that the movable barrier is mechanically brought into the open state. This allows a low error-prone and cost-effective mechanical implementation of the detection device. The movable detector element can be moved essentially horizontally, wherein in some examples it is moved exclusively horizontally, and in other examples it can also be moved partially vertically, e.g. in a direction of movement with an angular inclination of up to ±30°, up to ±20°, up to ±10° or approximately ±10° relative to the horizontal.

The shelf may have at least one drawer. The shelf can thus be configured as a changing table or changing unit, for example, which also offers storage space. The drawer can be located under the surface of the shelf.

The shelf may have a device for locking at least one drawer, which is configured to activate when the detection device detects a caregiver. In practice, in some cases an infant may fall from the changing table even though an adult is standing in front of it—usually when the person is busy getting something out of the lower drawers of the changing table and is looking away from the infant. This is prevented by locking the drawer. It is impossible for the caregiver to be distracted by pulling an object out of the drawer or by searching in the drawer and thus averting the caregiver's gaze. Access is only possible when the barrier is closed, e.g. by reaching to the side of the drawer (if the detection device is configured to detect the caregiver at the front of the shelf).

There may also be provided a shelf for changing an infant or young child, comprising a facility for automatically detecting a caregiver, with at least one drawer and a locking device for locking the drawer. The locking device may be configured to be activated when the detecting device detects a caregiver. In other words, the shelf need not necessarily have a movable barrier. However, the shelf can be configured with the features described herein.

The locking device may be configured to deactivate if the detection device does not detect a caregiver. This allows the drawer to be accessed again without the caregiver having to unlock it separately. When no caregiver is detected, the locking device is deactivated by the detection device.

The locking device may be configured in such a way that at least one lower drawer of the shelf is locked. However, one or more upper drawers can, for example, remain unlocked. The locking device described in connection with a drawer may be used alternatively or in addition to locking one or more doors of the shelf.

An inverted locking device may also be provided which is configured such that it is deactivated when the detection device detects a caregiver. The locking device may be arranged to be activated when the detecting device does not (no longer) detect a caregiver. This is generally conceivable for applications for drawers of any item of furniture, e.g. a chest of drawers, a cupboard, etc. A drawer locking device may be provided which is configured such that it is deactivated when a caregiver is detected by a detection device. For example, the detection device may be located on a front (accessible) side of the item of furniture and generally as explained herein. However, if a caregiver is detected, the drawer will be unlocked. As soon as a caregiver is no longer detected, the drawer is locked, i.e. the locking device is reactivated. For example, this prevents a drawer from opening unintentionally (e.g. on ships, in aircraft, etc.) and at the same time the drawer can be opened easily and conveniently by a caregiver.

The device for automatic detection of a caregiver can be triggered mechanically, e.g. according to the examples described herein. However, it is also possible to trigger the device for detection electronically, for example. For example, the presence of a caregiver can be detected by one or more photoelectric sensors, capacitive touch sensors and/or touch- or weight-sensitive floor mats. The device for detection can, for example, have a photoelectric sensor, a capacitive touch sensor and/or a touch- or weight-sensitive floor mat. These can be set up in such a way that a caregiver is automatically detected if a caregiver is placed at the front of the shelf. The corresponding signal transmission could be realized through wired connections via cable, or wireless, with motors, for example, taking over the movement of the barrier and/or locking of the drawers etc.

While the present invention is described here primarily in relation to shelves for changing babies or toddlers nappies, its application to other shelves is conceivable.

4. BRIEF DESCRIPTION OF THE FIGURES

In the following detailed description, possible embodiments of the invention are described with reference to the following figures.

5. DETAILED DESCRIPTION OF PREFERRED EMBODIMENTS

Possible embodiments of the present invention will be described below for the sake of simplicity, mainly in relation to changing tables and/or changing units. However, the concept of the present invention can be applied in a similar way to shelves intended, for example, as attachments for changing tables and/or changing chests of drawers, or to other types of surfaces such as tables, workbenches, drawing tables and chests of drawers in general.

In addition, for the sake of brevity, only a few embodiments can be described below. The skilled person will recognise that the specific features described in relation to these embodiments may be modified and combined in other ways and that individual features may be omitted if they are not essential. The general explanations in the above sections remain valid for the more detailed explanations that follow.

Figure 1A:
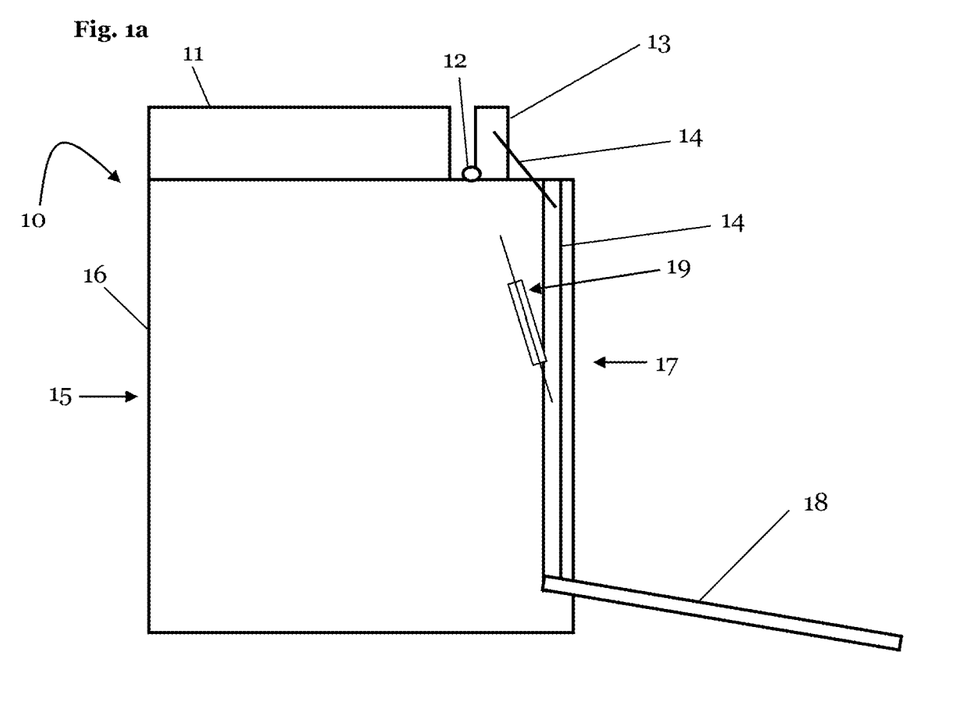
FIG. 1a-b: First embodiment of a shelf with a movable barrier in a closed and an open state.

FIG. 1a shows a side view of a first embodiment of a shelf 10 for changing an infant or toddler with a movable barrier 13 in a closed state. The shelf 10 is configured as a changing table with a rear side 15 and a front side 17 intended for access by a caregiver. Shelf 10 has a side wall 16. In other design examples, several side walls may be provided or no side wall may be provided. Shelf 10 can have a height of about 70 cm to 120 cm, or about 80 cm to 100 cm, which is convenient for access by an adult caregiver. In other embodiments, the shelf can also be configured with a lower height, in which case it can be configured in particular as a support for a table or chest of drawers, a bathtub, etc.

Shelf 10 has an upper surface configured to support the infant or toddler. The movable barrier 13 is located on the upper surface of shelf 10 and facing the front 17 of shelf 10. The movable barrier 13 may extend substantially perpendicular to the upper surface of the shelf 10 and substantially parallel to the front side 17 of the shelf 10 (or tangential to the front face in the case of a rounded shelf).

The movable barrier 13 has a movable element that is arranged in a rotating manner. The movable element can be rotated from a substantially vertical arrangement (closed position) to a substantially horizontal arrangement (open position). The movable element may be in the form of a board. The movable barrier 13 has an axis of rotation 12 which is substantially parallel to the front 17 of the shelf 10. For example, the axis of rotation 12 can run along a lower edge of the movable element. The rotation axis 12 can be configured as a hinge or have a hinge that can be attached to the upper surface of the shelf 10, for example. Instead of a hinge, other elements can also be provided to support the movable element in a rotatable manner, e.g. a shaft etc.

Shelf 10 has an area 18 at the front 17 to accommodate a caregiver. The area 18 can be provided in such a way that it is placed on the floor in front of the front side 17 of the shelf 10. The area 18 may extend substantially along the full width of the front 17 of the shelf 10. The area 18 is configured so that the caregiver must get onto it 18 to access the shelf 10. The area 18 is thus configured to receive the caregiver and to act as a device for automatic detection of the caregiver. If a caregiver wants to access the shelf 10, he or she must enter the area 18.

The area 18 can be configured as at least one board. The area 18 is connected to the movable barrier 13 by at least one connecting element 14. In the illustrated embodiment, two connecting elements 14 are provided, which are rigid, e.g. in the form of rods or bars. The upper connecting element 14 is connected to the lower connecting element 14 and to the movable barrier 13 (more precisely: with the movable element of the movable barrier 13) via a swivel joint. The lower connecting element 14 is connected to the area 18 via a swivel joint. Connecting elements 14 can be provided on the left and/or right side of the shelf 10. For example, connecting elements 14 could also be provided only once, for example, on a lateral side of the shelf 10 or in the middle. In other embodiments, a different number and/or type of connecting elements can be used, for example, elements which only transmit tensile forces, e.g. rope, chain, etc.

The lower connecting element 14 is connected to a reset device 19. The reset device may, for example, have a mechanical or pneumatic spring. In the embodiment illustrated, the reset device 19 has a tension spring. The reset device 19 is connected on one side to the lower connecting element 14 and on the other side to the shelf 10, for example, to the side wall 16 of the shelf 10, so that a restoring force can be transmitted between the shelf 10 and the connecting element 14. The resetting device 19 can be mounted with any orientation. It is important that it reliably returns the movable barrier 13 to the closed state as soon as no caregiver is detected any more.

In other design examples, at least one reset device 19 may alternatively or additionally be connected to the area 18, another connecting element 14 and/or the movable barrier 13. Also, at least one reset device can be provided alternatively or additionally, which has a compression spring, e.g. a pneumatic spring. The pneumatic spring may be located for example, on an underside of the area 18, e.g. between the area 18 and a lower surface of the shelf 10.

The connecting elements 14 and the resetting device 19 may be located at least partially within the shelf 10. For example, the side wall 16 and optionally the front and rear walls of the shelf may at least partially surround the connecting elements 14 and the resetting device 19.

The resetting device 19 is so arranged that the area 18 moves downwards against the force of the resetting device 19 when a certain weight is applied. Via the connecting elements 14, the movable element of the movable barrier 13 is thereby rotated about the axis of rotation 12 so that the movable barrier 13 is moved into the open state (shown in FIG. 1b).

In addition to the movable barrier 13, the shelf 10 has at least one immovable barrier 11 to prevent the infant from falling over at least one other side of the shelf 10. The immovable barrier 11 can be firmly attached to the shelf 10, for example, the upper surface of the shelf 10. In the side view according to FIG. 1a only one immovable barrier 11 is shown on a lateral (e.g. left) side of the shelf 10. However, an immovable barrier can also be located on both lateral sides and/or on the rear side 15 of the shelf 10. In other design examples, the barriers on these sides may also be movable, as described in relation to the movable barrier 13.

Figure 1B:
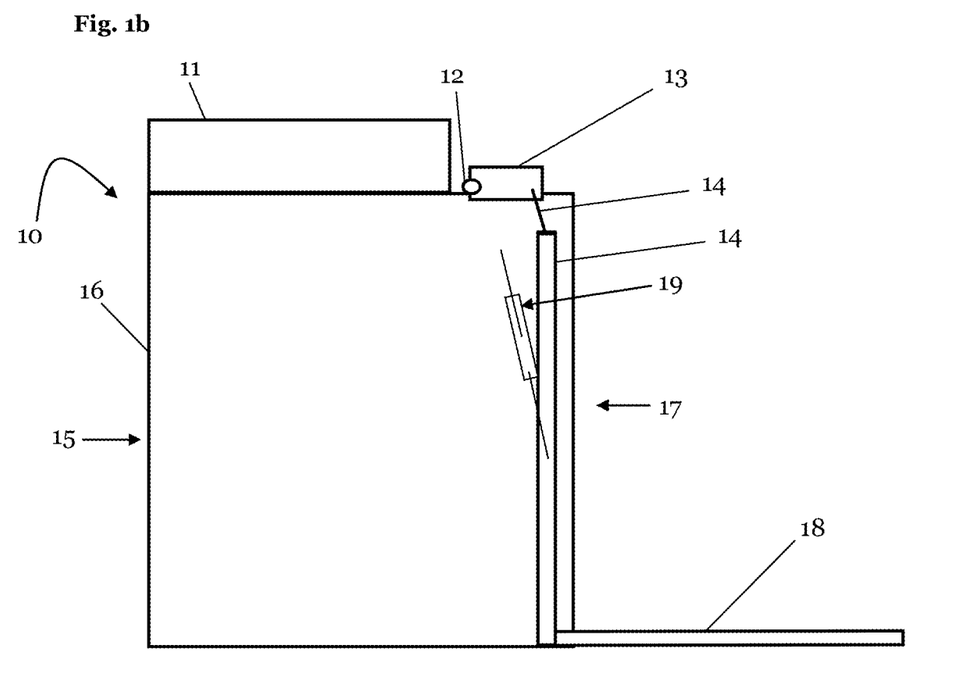

FIG. 1b shows the shelf 10 with the movable barrier 13 in open position. When open, the movable element of the movable barrier 13 can be arranged essentially parallel to the upper surface of the shelf 10. When open, the movable element of the movable barrier can be essentially flush with the upper surface of the shelf 10. The shelf 10 may, for example, have a depression for at least partially accommodating the movable element in the open state. The movement of the movable barrier 13 from the closed to the opened state can correspond, for example, to a rotation by about 70° to 100°, e.g. about 80° or about 90°.

The resetting device 19 is set up so that when the caregiver leaves the area 18, the area 18 is moved upwards again by the resetting device 19 so that the movable element of the movable barrier 13 is brought into the closed state (shown in FIG. 1a).

Figure 2A:
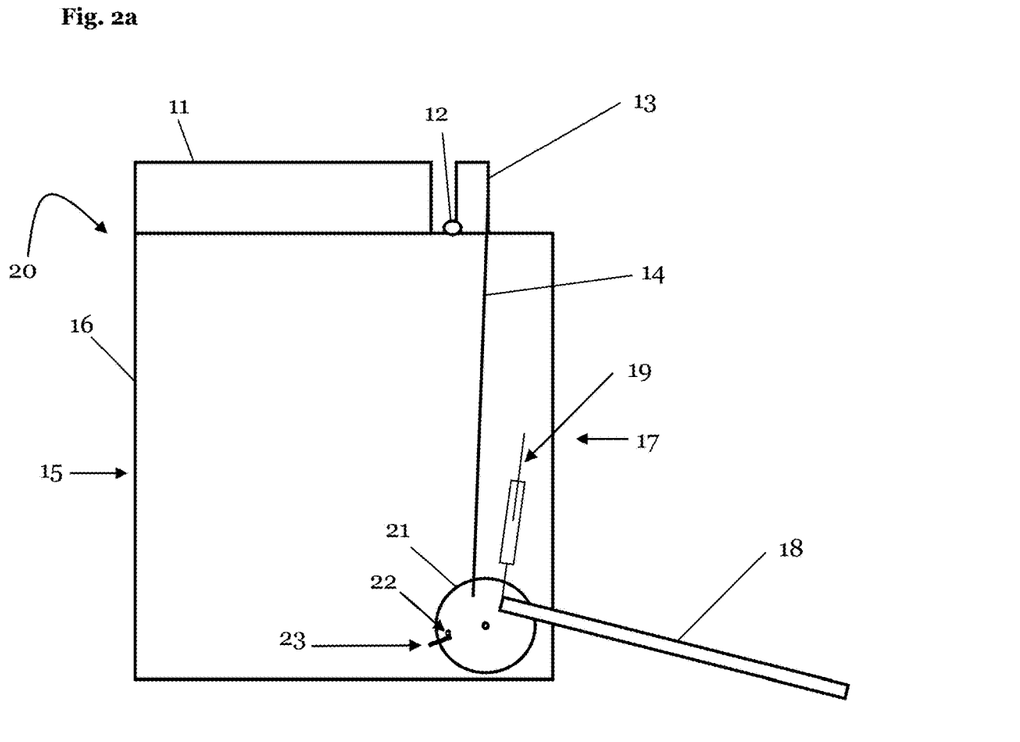
FIG. 2a-b: Second embodiment of a shelf with a movable barrier in a closed and an open state with a blocking device.

FIG. 2a shows a side view of a second design example of a shelf 20 for diaper changing with a movable barrier 13 in a closed state. The shelf 20 has a front side 17 and a rear side 15, a fixed barrier 11 and a side wall 16, and an area 18, which may be similar to the corresponding elements described in FIG. 1a and FIG. 1b.

At the front side 17 of the shelf 20 there is a movable barrier 13, which has a movable element and a rotation axis 12, which can also be configured similarly to the one described with reference to FIG. 1a. In addition, the movable element of the movable barrier 13 is connected to a blocking device 21 via a connecting element 14. The connecting element 14 can be configured in a similar way as described in relation to FIG. 1a and FIG. 1b. The connecting element 14 is rigid. The connecting element 14 can be hinged to the movable element of the movable barrier 13 and/or the blocking device 21. The blocking device 21 is in turn connected to the area 18, wherein an articulated connection is provided in FIG. 2a. However, one or more connecting elements may also be provided to connect the blocking device 21 and the area 18.

The blocking device 21 is set up to rotate, and has, for example, a roller that is arranged to rotate. The axis of rotation can be arranged substantially parallel to the axis of rotation of the movable element and/or substantially perpendicular to the direction of movement of the area 18. The area 18 is configured in such a way that when a caregiver is accommodated by the area 18, it moves downwards against a return device 19 connected to the area 18. The area 18 is connected to the blocking device 21 so that the latter is also moved when the area 18 moves downwards.

In the design example of FIG. 2a, the area 18 is connected to the blocking device 21 in such a way that the blocking device 21 or the roller of the blocking device 21 turns clockwise when the area 18 moves downwards. The blocking device 21 is further connected (via the connecting element 14) to the movable element of the movable barrier 13 in such a way that the clockwise rotation of the blocking device 21 moves the movable element from the closed to the open state (shown in FIG. 2b). In the design example shown in FIG. 2a, the clockwise rotation of the blocking device 21 initially results in a minimal upward movement of the rigid connecting element 14 to pass a radially aligned position relative to the (roller of the) blocking device 21. From this point on, the movable barrier 13 can also be moved into the open state by direct application of force (deactivated state of the blocking device). However, when the area 18 is moved downwards, the blocking device continues to rotate, so that the connecting element 14 is moved downwards after passing the radial position. The movable element of the movable barrier 13 is thus brought into the open state, e.g. rotated around the axis 12 as explained.

The blocking device 21 has a blocking element 22 which can for example, be configured as an elevation or bolt. The shelf 20 also has a stop 23. The stop 23 can, for example, be located on the side wall 16 of the shelf 20. In the design example according to FIG. 2a, the blocking element 22 and the stop 23 are arranged in such a way that in the closed state of the movable barrier 13, a movement of the movable barrier 13 in the direction of the open state is prevented by direct action of force on the movable barrier 13 (activated state of the blocking device). This is achieved by suitable connection of the movable element of the movable barrier 13 via the rigid connecting element 14 with the blocking device 21.

In the design example according to FIG. 2a, the blocking device 21 can only turn clockwise, but not counterclockwise, due to the arrangement of the blocking element 22 and the stop 23. A force acting on the movable barrier 13 in the direction of the open state results in a downward movement of the connecting element 14. The connecting element 14 is connected to the blocking device 21 in such a way that a downward movement of the connecting element 14 implies a counterclockwise rotation of the blocking device 21, which, however, is locked. This movement is just prevented by the interaction of the blocking element 22 and the stop 23, so that the movable element cannot be brought into the open state by direct force on the movable barrier 13. It is important for this purpose that the connecting element 14 is rigid. The blocking device 21 is configured in such a way that this can be achieved solely—as explained—by the area 18, which causes the blocking device 21 to rotate clockwise.

The blocking element 22 and the stop 23 may be generally arranged in such a way that, when the movable barrier 13 is closed, movement of the blocking device 21 is possible only in a first direction corresponding to a downward movement of the area 18, but not in a second direction corresponding to an upward movement of the area 18. In the design example shown in FIG. 2a, due to the arrangement of the blocking element 22 and the stop 23, the roller can only move clockwise (corresponding to a downward movement of the area 18), but not counterclockwise (corresponding to an upward movement of the area 18).

Figure 2B:
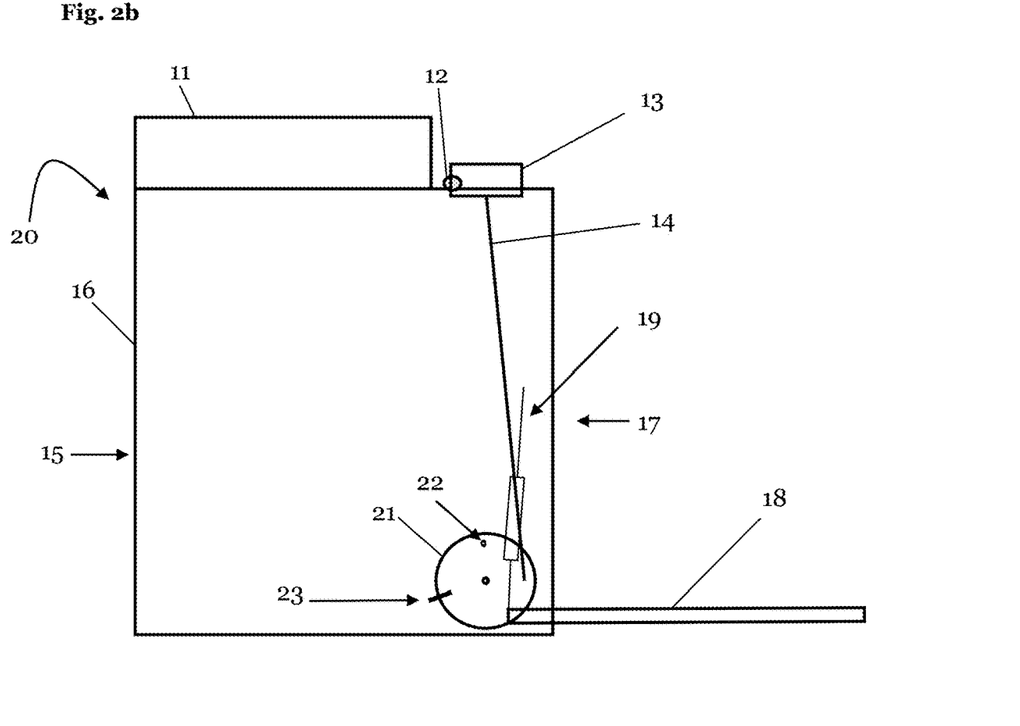

FIG. 2b shows the shelf 20 with the movable barrier 13 in open position. As soon as the caregiver leaves the area 18, it is moved upwards again by the resetting device 19. The movable barrier 13 is brought into the closed state. The blocking device 21 is thereby returned to the activated state in which the blocking element 22 rests against the stop 23.

The resetting device 19 can be configured in a similar way as explained with reference to FIG. 1a and FIG. 1b. In other design examples, as an alternative or in addition to the resetting device 19, a resetting device may be provided which is connected to the blocking device 21 so that the blocking device 21 is turned back counter-clockwise when the caregiver leaves the area 18. Alternatively or additionally, a reset device may also be connected to the connecting element 14 and/or the movable barrier 13. In some design examples, the resetting device 19 may alternatively or additionally have a compression spring, as explained with reference to FIG. 1a and FIG. 1b.

As explained with reference to FIG. 1a and FIG. 1b, the resetting device 19 and the connecting element 14 can be located at least partially within the shelf 20. Also the resetting device 21 and the stop 23 can be arranged inside the shelf 20.

Figure 3A:
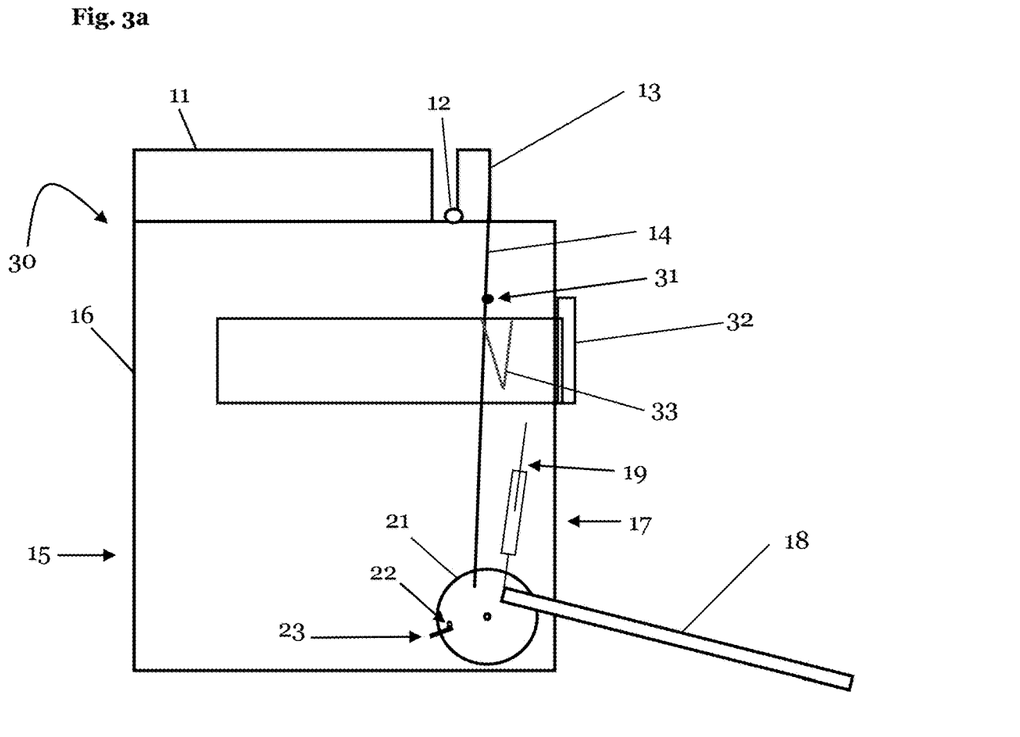
FIG. 3a-b: Third embodiment of a shelf with a movable barrier in a closed and an open state with a blocking device and a device for locking a drawer.
Figure 3B:
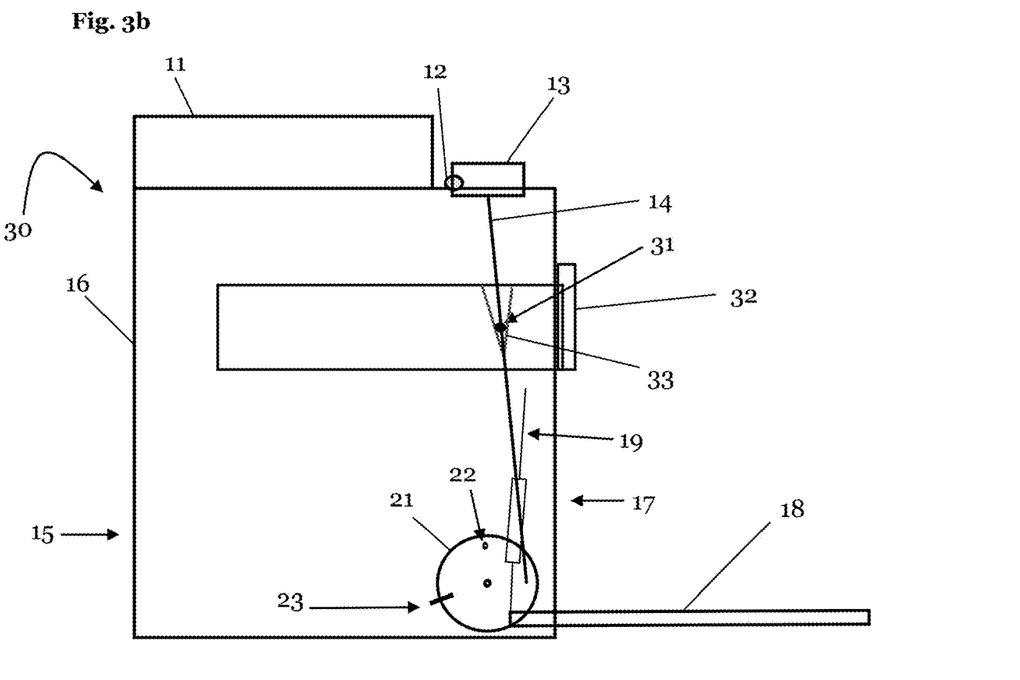

FIGS. 3a and 3b show a side view of another example of a shelf 30, which has a fixed barrier 11 and a side wall 16. On a front side 17 opposite a rear side 15, the shelf 30 has a movable barrier 13 which can be rotated about a rotation axis 12. The shelf 30 also has an area 18, a movable barrier 13, a connecting element 14, a reset device 19, and a blocking device 21 with a blocking element 22, as well as a stop 23. In this respect, the shelf 30 can be configured similar to the shelf 20 described with reference to FIGS. 1a, 1, 2a, 2b.

In addition, the shelf 30 has a drawer 32, which can be placed inside the shelf 30. The drawer 32 can be arranged at the front 17 of the shelf 30 and can be moved horizontally in the direction of the front. Although only one drawer 32 is shown in FIG. 3a, several drawers 32 can also be provided. The at least one drawer 32 has a locking device 33, which can be configured, for example, as a depression in a side wall of the drawer 32. For example, a conical notch which may be located on an upper side of a side wall of the drawer 32 or a continuous opening in a side wall of the drawer 32 may be provided. Alternatively or additionally, the locking device 33 may have an elevation on a side wall of the drawer 32. The connecting element 14 has a thickening 31, which may be configured as a bolt, for example. The thickening 31 and the blocking device 33 can be located on one side of the drawer 32 or on both sides of the drawer 32.

As shown in FIG. 3b and already explained above in relation to FIGS. 1a, 1b, 2a, 2b, the connecting element 14 moves downwards when the area 18 receives a caregiver, so that the barrier 13 is brought into the open state. The thickening 31 of connecting element 14 also moves downwards to a blocking position accordingly. The thickening 31 and the locking device 33 are configured in such a way that opening of drawer 32 in the blocking position is prevented. In the blocking position, the thickened part 31 can lie against the locking device 33, for example, so that a movement of the locking device 33 in horizontal direction, or at least in horizontal direction towards the front 17 of the shelf 30 is prevented. In other words, when a caregiver is detected at the front 17 of the shelf 30, not only is the movable barrier 13 brought into the open position, but also the opening of the drawer 32 is blocked. This prevents the caregiver from being distracted by opening the drawer 32 and subsequently searching for objects in the drawer 32 and/or taking objects out of the drawer 32.

As soon as no caregiver is detected, i.e. in the embodiment of FIG. 3b, as soon as the caregiver leaves the area 18, the thickening 31 is moved out of the blocking position again (shown in FIG. 3a). In the design example of FIG. 3b, this movement takes place upwards out of the locking device 33. The drawer 32 can thus be opened again.

Figure 4A:
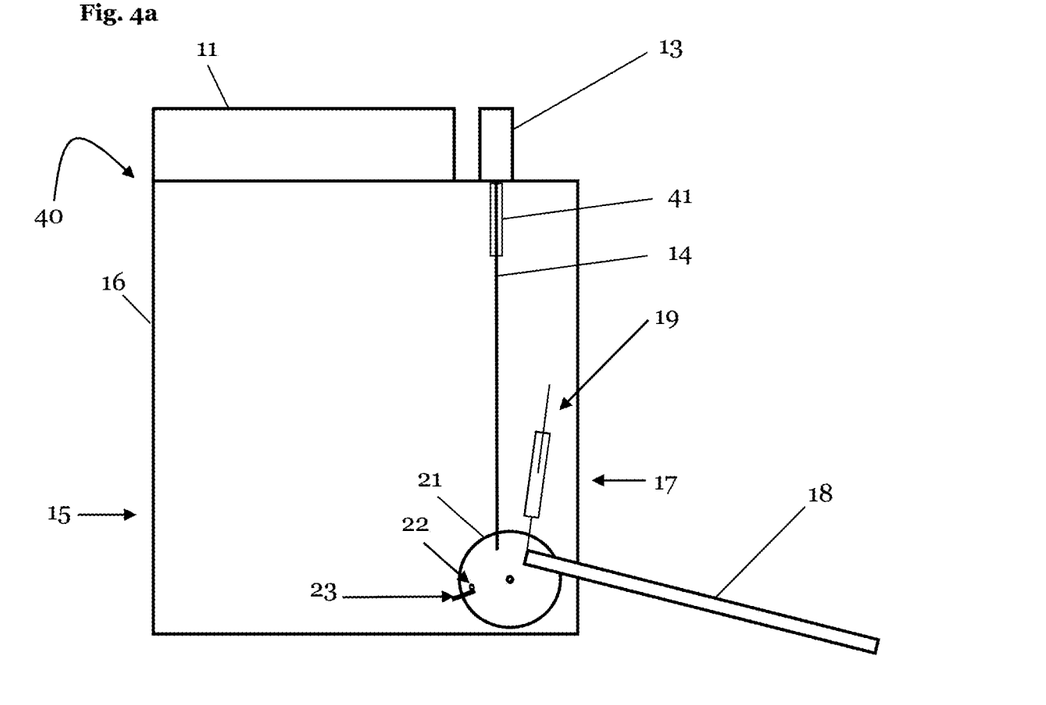
FIG. 4a-b: Fourth embodiment of a shelf with a movable barrier in a closed and an open state including a blocking device.
Figure 4B:
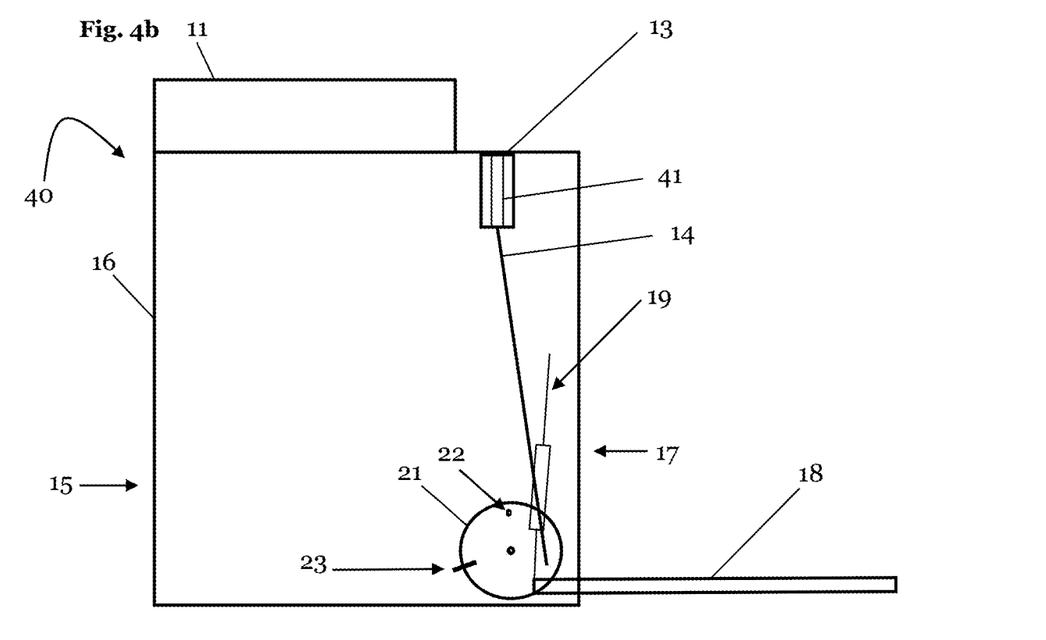

FIGS. 4a and 4b show side views of another example of a shelf 40, which has a front side 17, a rear side 15, a fixed barrier 11, a side wall 16, an area 18, a reset device 19, a blocking device 21 with a blocking element 22 and a stop 23. In this respect, the shelf 40 may be configured in a similar way as explained with reference to FIGS. 2a, 2b, 3a, 3b.

The shelf 40 has a movable barrier 13 with a movable element. The movable element can be configured as explained above with reference to FIGS. 1a, 1b, 2a, 2b, 3a, 3b. However, the movable element is not rotatably arranged. Rather, it is connected to the barrier 21 via a connecting element 14 in such a way that it is moved downwards when the area 18 moves downwards. For example, the shelf 40 may have a depression into which the movable element is at least partially lowered. The movable element can be lowered vertically into the shelf 40. The shelf 40 can have a guide device 41, e.g. a rail, to facilitate easy and even lowering of the movable element. The guide device 41 can prevent the movable element from jamming or tilting.

The movable element can be brought into the open state by the movement of the area 18 downwards, which is triggered by the reception of a caregiver (shown in FIG. 4b). When opened, a top of the movable element can flush with an upper surface of the shelf 40, which is intended for laying the infant.

When the caregiver leaves the area 18, the reset device 19 moves it upwards again, so that the connecting element 14 also moves upwards, and consequently the movable element of the movable barrier 13, so that the movable barrier is brought into the closed state (shown in FIG. 4a).

Figure 5A:
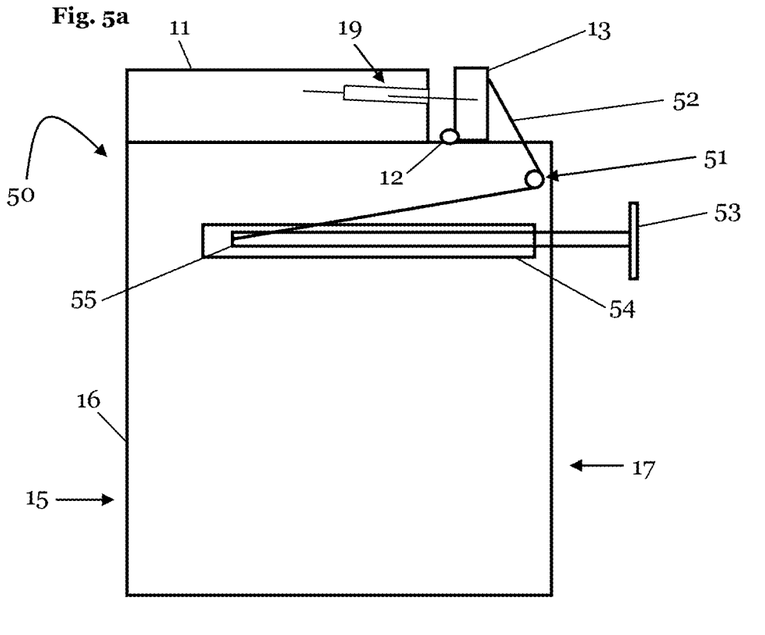
FIG. 5a-b: Fifth embodiment of a shelf with a movable barrier in a closed and an open state.
Figure 5B:
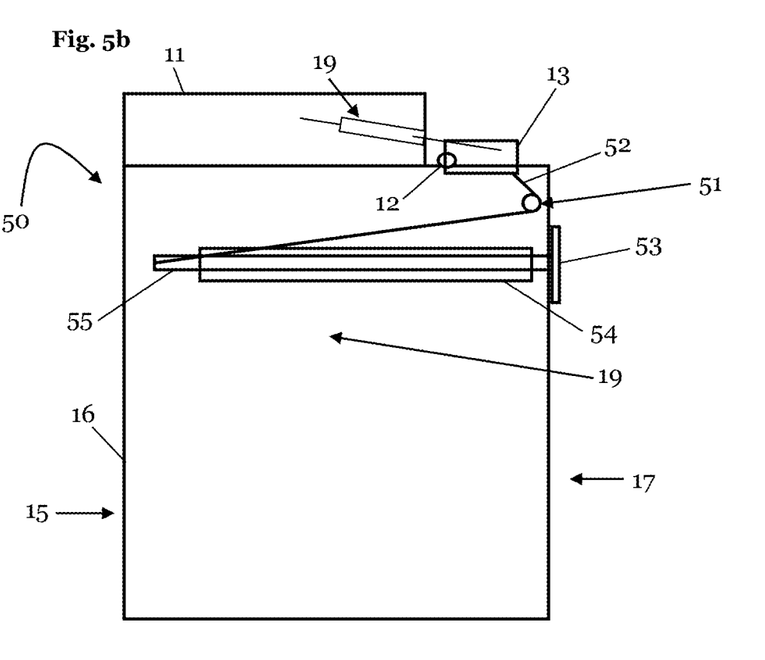

FIGS. 5a and 5b show a side view of another type of shelf 50, which has a fixed barrier 11, a front face 17, a rear face 15 and a side face 16, and a movable barrier 13 with an axis of rotation 12, similar to those shown in FIGS. 1a, 1b, 2a, 2b, 3a, 3b, 4a, 4b.

A device for detecting a caregiver is arranged at the front 17 of the shelf 50, which has a horizontally movable detector element 53. The horizontally movable detector element 53 extends in horizontal direction over a substantial part of the front side 17, so that the caregiver, when accessing the front side 17, automatically moves the movable detector element 53 towards the shelf 50. The movable detector element 53 may, for example, comprise a plate or board extending in the horizontal direction over the entire width of the front side 17 or at least over a central area of the front side 17 comprising at least 50% or at least 75% of the width of the front side 17. The movable detector element 53 may have a height of at least 5 cm, preferably at least 10 cm, so that the caregiver does not find the movement of the detector element 53 unpleasant. The height can be essentially constant over the entire width of the detector element 53.

The shelf 50 is configured in such a way that the movement of the detector element 53 towards the shelf 50 brings the movable barrier 13 into the open state. For this purpose, the detector element 53 can have an extension element 55 which moves along a guide element 54 of the shelf 50. The extension element 55 can be arranged essentially horizontally and/or essentially perpendicular to the front of the shelf 50. The guide element 54 is arranged essentially parallel to the extension element 55 and can be configured as a rail, for example. The extension element 55 and the guide element 54 can be arranged at least partially within the shelf 50. The guide element 54 can, for example, be arranged on a side surface 16 of the shelf 50. In particular, an extension element 55 and a corresponding guide element 54 can also be arranged on both lateral sides of the shelf 50. However, it is also possible to provide these two elements only once, e.g. on one lateral side, or (viewed from the front 17) running centrally through the shelf 50.

A connecting element can be arranged on the extension element 55, so that the movable barrier 13 is brought into the open state by the movement of the movable detector element 53 towards the shelf 50. A rigid connecting element can be used for this purpose, as described in relation to FIGS. 1a, 1b, 2a, 2b, 3a, 3b, 4a, 4b. In the design example according to FIG. 5a, however, a tensile element 52, e.g. a cord or chain, is provided which merely transmits a tensile force. The tension element 52 is connected to the movable barrier 13, wherein the tensile element 52 is deflected by a pulley 51. By moving the movable detector element 53 towards the shelf 50, the movable barrier 13 is pulled into the open state by the tensile element 52 (shown in FIG. 5b). The pulley 51 ensures that the vector of the applied force of the movable detector element 53 is directed in the correct direction.

The shelf 50 has a resetting device 19, which can be configured in a similar way as described with reference to FIG. 1a, 1b, 2a, 2b, 3a, 3b, 4a, 4b. When the caregiver leaves the shelf 50, the movable barrier 13 is moved by the resetting device 19 back into the closed position (shown in FIG. 5a), as the pulling effect by the tensile element 52 is then no longer present. The resetting device is connected on the one hand to the movable element of the movable barrier 13 and on the other hand to the immovable barrier 11 of the shelf 50. Alternatively, the reset device could also be connected to another element of the shelf 50, e.g. a side wall 16. By moving the movable barrier 13 back to the closed state, the movable detector element 53 is also moved away from the shelf 50 again.

Alternatively or additionally, it is also possible to set up the rotation axis 12 as a reset device, e.g. by using a pretensioned hinge which rotates the movable barrier back to the closed state when the tensile force is removed by the tensile element 52. Other resetting devices may also be provided, as explained in relation to FIG. 1a, 1b, 2a, 2b, 3a, 3b, 4a, 4b. For example, a further resetting device may be connected to the shelf 50, e.g. the side wall 16 of the shelf 50. On the other hand, the further resetting device may be connected to the extension element 55, the movable detector element 53 and/or the tensile element 52 to support their return movement.

In other design examples, the tensile element 52 and the pulley 51 can also pull the movable element of the movable barrier 13 downwards, so that the movable element can be brought into the open state by lowering it as shown in FIGS. 4a and 4b. A guiding element 41 can also be provided for this purpose, as explained in relation to FIGS. 4a and 4b.

The guide element 54, the extension element 55, the tensile element 52 and/or the pulley 51 can be arranged at least partially within the shelf 50.

The invention claimed is:

1. A shelf having a surface for changing an infant or toddler, comprising:
   a movable barrier arranged at the surface of the shelf to prevent the infant or toddler from falling from the surface;
   a facility for automatically detecting a caregiver;
   wherein the facility for automatically detecting is configured to bring the movable barrier into an open state when the facility for automatically detecting detects a caregiver;
   wherein the facility for automatically detecting is further configured to bring the movable barrier into a closed state when the facility for automatically detecting does not detect a caregiver.

2. The shelf according to claim 1, wherein the shelf comprises at least one drawer and a device for locking the drawer, the device for locking configured such that it is activated when the facility for automatically detecting detects a caregiver.

3. The shelf according to claim 1, wherein the shelf comprises a blocking device which is configured such that the movable barrier cannot be moved into the open state by direct application of a force to the movable barrier.

4. The shelf according to claim 3, wherein the blocking device is movable in a first direction of movement and locks in a second direction of movement.

5. The shelf according to claim 4, wherein the shelf is designed such that the facility for automatically detecting, when bringing the movable barrier into the open state, moves the blocking device in the first direction of movement.

6. The shelf according to claim 4, wherein the shelf is configured such that a direct application of a force on the movable barrier implies a movement of the blocking device in the second direction of movement.

7. The shelf according to claim 3, the shelf being configured such that the blocking device is activated when the facility for automatically detecting does not detect a caregiver.

8. The shelf according to claim 3, wherein the shelf is designed such that the blocking device is deactivated when the facility for automatically detecting detects a caregiver.

9. The shelf according to claim 1, the shelf having a front side intended for access by a caregiver, the movable barrier being located at least at the front side.

10. The shelf according to claim 1, wherein an immovable barrier is arranged on a right side, a left side and/or a rear side of the shelf.

11. The shelf according to claim 1, wherein the movable barrier comprises at least one movable element which is rotatable.

12. The shelf according to claim 1, wherein the movable barrier has at least one movable element which can be lowered under a surface of the shelf.

13. The shelf according to claim 1, where the facility for automatically detecting detects a weight of the caregiver.

14. The shelf according to claim 1, wherein the facility for automatically detecting comprises an area adapted to accommodate the caregiver.

15. The shelf according to claim 14, wherein the area is configured to move downwards when receiving a caregiver, so that the movable barrier is mechanically brought into the open state.

16. The shelf according to claim 1, wherein the shelf comprises a front side intended for access by the caregiver, and the facility for automatically detecting comprises a horizontally movable detector element arranged at the front side.

17. The shelf according to claim 16, wherein the detector element is configured such that it is moved horizontally when the caregiver accesses the shelf, so that the movable barrier is mechanically brought into the open state.

18. A shelf for changing an infant or toddler, comprising:
a facility for automatically detecting a caregiver;
at least one drawer and a device for locking the at least one drawer;
wherein the device for locking is configured to be activated when the facility for automatically detecting detects a caregiver;
wherein the device for locking is configured such that it is deactivated when the facility for automatically detecting does not detect a caregiver.

19. An attachment for a changing table or changing unit for changing an infant or toddler, comprising:
a movable barrier which is configured to be arranged at a surface of the changing table or changing unit to prevent the infant or toddler from falling from the surface;
a facility for automatically detecting a caregiver;
wherein the facility for automatically detecting is configured to bring the movable barrier into an open state when the facility for automatically detecting detects a caregiver;
wherein the facility for automatically detecting is further configured to bring the movable barrier into a closed state when the facility for automatically detecting does not detect a caregiver.

20. A shelf having a surface for changing an infant or toddler, comprising:
a movable barrier arranged at the surface of the shelf to prevent the infant or toddler from falling from the surface;
a facility for automatically detecting of a caregiver;
wherein the facility for automatically detecting is configured to bring the movable barrier into an open state when the facility for automatically detecting detects a caregiver;
wherein the facility for automatically detecting comprises an area adapted to accommodate the caregiver;
wherein the area is configured to move downwards when receiving a caregiver, so that the movable barrier is mechanically brought into the open state.

21. A shelf having a surface for changing an infant or toddler, comprising:
a movable barrier arranged at the surface of the shelf to prevent the infant or toddler from falling from the surface;
a facility for automatically detecting of a caregiver;
wherein the facility for automatically detecting is configured to bring the movable barrier into an open state when the facility for automatically detecting detects a caregiver; and
where the facility for automatically detecting detects a weight of the caregiver.

22. A shelf having a surface for changing an infant or toddler, comprising:
a movable barrier arranged at the surface of the shelf to prevent the infant or toddler from falling from the surface;
a facility for automatically detecting of a caregiver;
wherein the facility for automatically detecting is configured to bring the movable barrier into an open state when the facility for automatically detecting detects a caregiver;
wherein the shelf comprises a blocking device which is configured such that the movable barrier cannot be moved into the open state by direct application of a force to the movable barrier;
the shelf being configured such that the blocking device is activated when the facility for automatically detecting does not detect a caregiver.

* * * * *